(12) United States Patent
Hasegawa et al.

(10) Patent No.: US 9,281,534 B2
(45) Date of Patent: Mar. 8, 2016

(54) FUEL CELL AND VEHICLE INCLUDING THE FUEL CELL

(75) Inventors: Takuya Hasegawa, Yokohama (JP); Ryuji Fujieda, Zushi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 278 days.

(21) Appl. No.: 13/509,136

(22) PCT Filed: Nov. 15, 2010

(86) PCT No.: PCT/JP2010/070300
§ 371 (c)(1),
(2), (4) Date: May 14, 2012

(87) PCT Pub. No.: WO2011/059087
PCT Pub. Date: May 19, 2011

(65) Prior Publication Data
US 2012/0219875 A1    Aug. 30, 2012

(30) Foreign Application Priority Data

Nov. 13, 2009    (JP) ................................. 2009-259611

(51) Int. Cl.
*H01M 8/10*    (2006.01)
*H01M 8/02*    (2006.01)
*H01M 8/24*    (2006.01)

(52) U.S. Cl.
CPC ............ *H01M 8/1004* (2013.01); *H01M 8/026* (2013.01); *H01M 8/241* (2013.01); *H01M 2008/1095* (2013.01); *H01M 2250/20* (2013.01); *Y02E 60/521* (2013.01); *Y02T 90/32* (2013.01)

(58) Field of Classification Search
CPC .... H01M 8/1004; H01M 8/026; H01M 8/241
See application file for complete search history.

(56) References Cited

U.S. PATENT DOCUMENTS

| 4,175,165 A | 11/1979 | Adlhart |
| 6,277,511 B1 | 8/2001 | Iwase et al. |

(Continued)

FOREIGN PATENT DOCUMENTS

| CA | 2 374 293 A1 | 9/2001 |
| CN | 1666363 A | 9/2005 |

(Continued)

OTHER PUBLICATIONS

Chinese Office Action dated Apr. 18, 2014 (5 pgs.).

(Continued)

*Primary Examiner* — Barbara Gilliam
*Assistant Examiner* — Angela Martin
(74) *Attorney, Agent, or Firm* — Foley & Lardner LLP

(57) ABSTRACT

A fuel cell (1) includes a stacked body of a membrane electrode assembly (3) and of separators (2). Then, the membrane electrode assembly (3) and the separators (2) are formed into a substantially rectangular shape, the separators (2) include flow passages. Moreover, an aspect ratio R as a ratio (flow passage length/flow passage width) of a flow passage length with respect to a flow passage width is 0.01 or more to less than 2. Furthermore, a horizontal direction equivalent diameter D (mm) of the flow passages satisfies Expression (1):

$$D = B \times (R \times A_{cat})^{1/3} \quad \text{Expression (1)}$$

where Acat is a catalyst area ($cm^2$) of the membrane electrode assembly (3), and B is a constant of 0.005 or more to 0.2 or less.

11 Claims, 10 Drawing Sheets

(56) References Cited

U.S. PATENT DOCUMENTS

| | | |
|---|---|---|
| 6,884,536 B1 * | 4/2005 | Hatoh et al. ............ 429/433 |
| 2006/0040143 A1 | 2/2006 | Aoki et al. |
| 2006/0088746 A1 | 4/2006 | Tuma et al. |
| 2006/0234725 A1 | 10/2006 | Litwin |
| 2010/0068570 A1 | 3/2010 | Otake |

FOREIGN PATENT DOCUMENTS

| | | | |
|---|---|---|---|
| CN | 101048905 A | 10/2007 | |
| EP | 0 971 428 A2 | 1/2000 | |
| JP | 54-22537 A | 2/1979 | |
| JP | 1-279572 A | 11/1989 | |
| JP | 08-180883 * | 7/1996 | ............ H01M 8/02 |
| JP | 8-180883 A | 7/1996 | |
| JP | 2000-30730 A | 1/2000 | |
| JP | 2001-126746 A | 5/2001 | |
| JP | 2005-190946 A | 7/2005 | |
| JP | 2006-108027 * | 4/2006 | ............ H01M 8/02 |
| JP | 2006-108027 A | 4/2006 | |
| JP | 3939150 B2 | 7/2007 | |
| JP | 2008-159291 A | 7/2008 | |
| JP | 2009-266518 A | 11/2009 | |
| WO | WO 2008/070393 A2 | 6/2008 | |
| WO | WO 2008/125943 * | 10/2008 | ............ H01M 8/24 |
| WO | WO 2008/125943 A2 | 10/2008 | |

OTHER PUBLICATIONS

Supplementary European Search Report dated Dec. 16, 2014, 8 pgs.

* cited by examiner (A)

(B)

(C)

(A)

(B)

(A)

(B)

(C)

FUEL CELL AND VEHICLE INCLUDING THE FUEL CELL

TECHNICAL FIELD

The present invention relates to a fuel cell and to a vehicle including the fuel cell. In detail, the present invention relates to a fuel cell that is miniaturized while maintaining anti-flooding characteristics thereof, and to a vehicle including the fuel cell.

BACKGROUND ART

A fuel cell is a kind of a power generation device that takes out electrical energy by electrochemically oxidizing fuel such as hydrogen and methanol, and in recent years, has attracted attention as a supply source of clean energy. The fuel cell is classified into a phosphoric acid type, a molten carbonate type, a solid oxide type, a polymer electrolyte type and the like in accordance with types of electrolytes for use.

Among them, the polymer electrolyte fuel cell (PEFC) includes a membrane electrode assembly (MEA) in which electrodes are arranged on both surfaces of an electrolyte membrane. Then, the PEFC generates electricity by supplying hydrogen (fuel gas) to one surface of the membrane electrode assembly and supplying oxygen (oxidant gas) to the other surface thereof. The PEFC as described above can obtain a volumetric power density equivalent to that of an internal combustion engine, and accordingly, a research to put the PEFC into practical use as a power supply of an electric vehicle or the like is advanced (for example, refer to Patent Literatures 1 and 2).

Here, as packaging methods for the membrane electrode assembly, various types such as a stack type, a pleat type and a hollow fiber type are proposed. Among them, such a stack fuel cell is widely used, which is composed by stacking sheet-like membrane electrode assemblies on one another while separating these membrane electrode assemblies from one another by sheet-like separators.

It is catalyst layers and electrolyte membrane, each having a thickness of approximately 0.1 mm, that have a power generation function in the fuel cell. Then, for the purpose of supplying the fuel gas and the oxidant gas, which are necessary for the power generation, while efficiently removing water produced following the power generation, a typical fuel cell includes gas flow passages with a height ranging from 0.5 to 2 mm and gas diffusion layers with a height ranging from 0.2 to 0.5 mm. That is to say, a thickness (cell pitch) of a single cell of the typical fuel cell ranges from 1 to 5 mm.

Here, a standard output of the single cell of the fuel cell ranges from 0.5 to 1.5 W/cm$^2$. Therefore, in a typical automotive fuel cell stack, a volumetric power density in an active area thereof contributing to the power generation ranges from 1 to 3 kW/L, and a volumetric power density thereof including a manifold and the like ranges from 0.5 to 1.5 kW/L.

CITATION LIST

Patent Literature

Patent Literature 1: Japanese Patent Unexamined Publication No. 2005-190946
Patent Literature 2: Japanese Patent No. 3939150

SUMMARY OF INVENTION

Incidentally, in order to use the fuel cell as the power supply of an automobile and the like, the fuel cell is required to be further miniaturized for the purpose of improving vehicle mountability, productivity and cost. Then, in order to improve the volumetric power density by means of the same catalyst area, it is effective to thin the single cell of the fuel cell.

However, for the conventional typical fuel cell, such a flow passage design that causes a predetermined pressure loss is made since the water produced following the power generation is removed by flows of hydrogen and air. Therefore, when the thickness of the single cell of the fuel cell is simply reduced for the purpose of the miniaturization, the pressure loss becomes excessive, and loads on a variety of fluid supply devices necessary for drive of the fuel cell are increased, and accordingly, there are limitations on the miniaturization in the conventional fuel cell.

For example, in a fuel cell of Patent Literature 2, it is disclosed that, in each of regions where separators are to be brought into contact with electrode layers (anode electrode layers, cathode electrode layers), a length of a long side thereof is set twice or more to six times or less a short side thereof, and further, a width, depth and the like of each of reaction gas flow passages are set within predetermined ranges. However, in the case where the long side and short side of each separator are in this ratio, if the depth of the flow passage is reduced, and the thickness of the single cell of the fuel cell is thinned, then the pressure loss becomes excessive.

The present invention has been made in consideration of such problems inherent in the conventional technology. Then, it is an object of the present invention to provide a fuel cell that is capable of being miniaturized while maintaining anti-flooding characteristics, and to provide a vehicle including the fuel cell.

A fuel cell according to an aspect of the present invention comprises a stacked body of a membrane electrode assembly including anode and cathode electrode layers on both surfaces of an electrolyte membrane, and of separators. Then, the membrane electrode assembly and the separators are formed into a substantially rectangular shape, the separators are smooth or include flow passages, each of the electrode layers comprises a gas diffusion layer and a catalyst layer. Moreover, an aspect ratio R as a ratio (flow passage length/flow passage width) of a flow passage length with respect to a flow passage width on a cathode side or anode side of the membrane electrode assembly is 0.01 or more to less than 2. Furthermore, a horizontal direction equivalent diameter D (mm) of the gas diffusion layer or the flow passages satisfies Expression (1):

$$D = B \times (R \times Acat)^{1/3} \qquad \text{Expression (1)}$$

(where Acat is a catalyst area (cm$^2$) of the membrane electrode assembly, and B is a constant of 0.005 or more to 0.2 or less).

BRIEF DESCRIPTION OF DRAWINGS

FIG. 2(A) is a plan view of a separator; FIG. 2(B) is a plan view of a membrane electrode assembly; and FIG. 2(c) is a view showing a state where the separators are arranged on both sides of the membrane electrode assembly.

FIG. 4(A) is a plan view showing the membrane electrode assembly at a time when a seal member is detached there-from; FIG. 4(B) is a plan view showing the membrane electrode assembly at a time when the seal member is attached thereto; and FIG. 4(C) is an enlarged plan view showing a widened portion formed between manifolds and a catalyst layer.

FIG. 6(A) is a perspective view of the separator, on a surface of which a gas flow passage is formed; and FIG. 6(B) is an enlarged perspective view of the gas flow passage.

DESCRIPTION OF EMBODIMENTS

Figure 1:
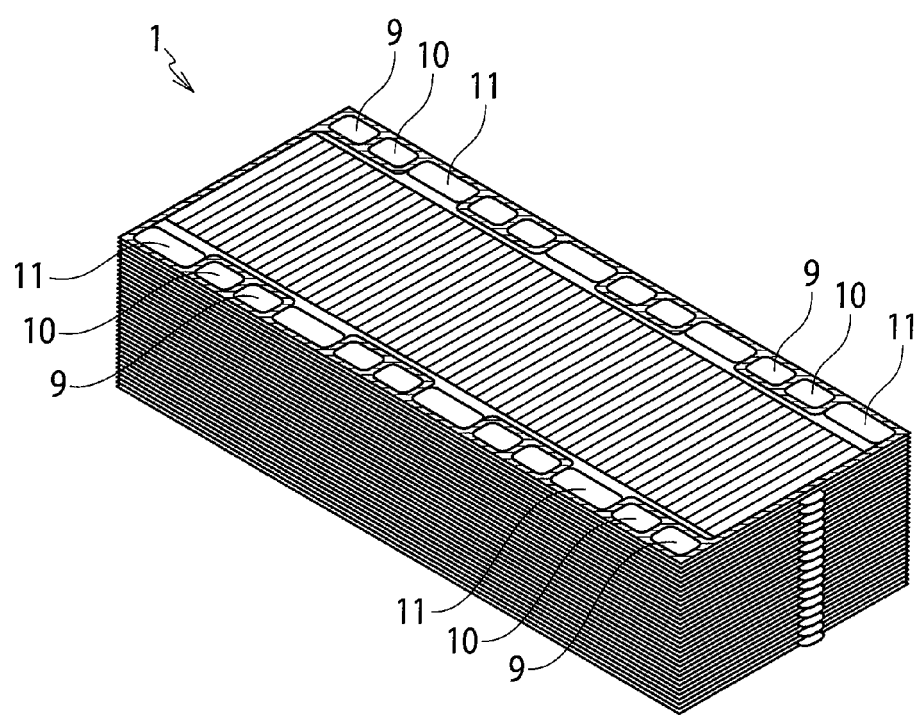
FIG. 1 is a perspective view showing a fuel cell according to an embodiment of the present invention.

A description is made below in detail of an embodiment of the present invention while referring to the drawings. Note that, in the description referring to the drawings, the same reference numerals are assigned to the same members, and a duplicate description is omitted. Moreover, dimensional ratios in the drawings are exaggerated for the sake of explanation convenience, and are sometimes different from the actual ratios.

As shown in FIG. 1 and FIGS. 2(A) to 2(C), a fuel cell 1 of this embodiment is a stack fuel cell (polymer electrolyte fuel cell) including a stacked body in which a plurality of fuel cell single cells 4 are stacked on one another, each fuel cell single cell 4 being formed by stacking a pair of sheet-like separators 2 and a sheet-like membrane electrode assembly 3 on one another. Note that, in this embodiment, the number of stacked fuel cell single cells 4 is not particularly limited. That is to say, both of the fuel cell single cell 4 that is single and a fuel cell stack formed by stacking the plurality of fuel cell single cells 4 on one another are incorporated in the fuel cell according to the present invention.

[Membrane Electrode Assembly]

Figure 3:
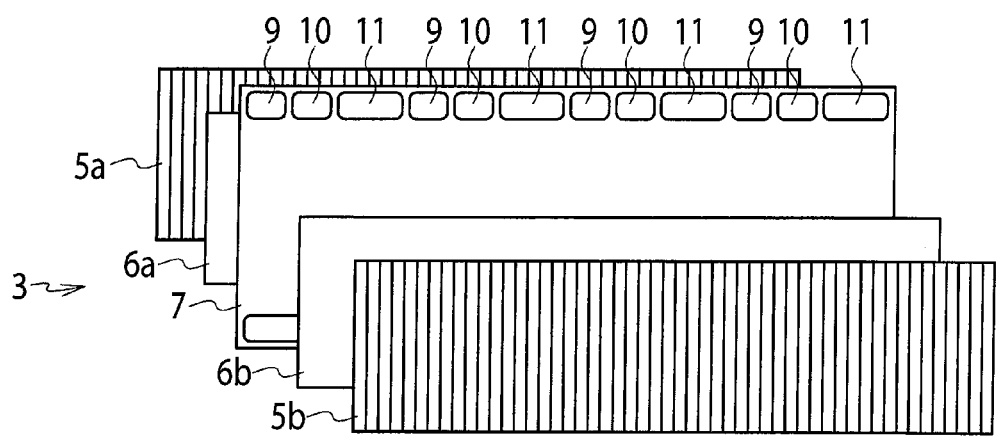
FIG. 3 is an exploded view of the membrane electrode assembly in the fuel cell of this embodiment.

As shown in FIG. 3, the membrane electrode assembly 3 is an assembly composed of five layers, which are, in order from a depth toward a front: a gas diffusion layer (anode-side gas diffusion layer) 5a; a catalyst layer (anode catalyst layer) 6a; an electrolyte membrane 7; a catalyst layer (cathode catalyst layer) 6b; and a gas diffusion layer (cathode-side gas diffusion layer) 5b. The membrane electrode assembly 3 is formed into a substantially rectangular shape when viewed from the above. The above-described membrane electrode assembly 3 is combined with the separators 2 having a substantially rectangular shape in the same way, and is supplied with oxygen (oxidant gas) and hydrogen (fuel gas), thereby generating electricity. Note that, in this specification, three layers which are the catalyst layer 6a, the electrolyte membrane 7 and the catalyst layer 6b are sometimes called a catalyst coated membrane (CCM), and two layers which are the catalyst layer 6 and the gas diffusion layer (GDL) 5 are sometimes called a gas diffusion electrode (GDE). Moreover, the gas diffusion electrode is sometimes simply called an electrode.

Note that the membrane electrode assembly 3 and the separators 2 do not have to have a complete rectangular shape, and may have a substantially rectangular shape if a flow passage length W1 and a flow passage width W2, which will be described later, can be specified. That is to say, in these pieces, corners of the rectangles may be chamfered, and further, these pieces may be ellipsoidal.

[Gas Diffusion Layer]

The gas diffusion layers (GDLs) 5a and 5b have a function to supply the fuel gas and the oxidant gas, which are supplied to the fuel cell, to the catalyst layers 6a and 6b, and a function to transfer electrons between the catalyst layers 6a and 6b and the separators 2. As long as an object of the present invention is not damaged, each of the gas diffusion layers 5a and 5b may further include another member (layer) on a surface layer thereof, in an inside thereof or in both of the surface layer and the inside. As such another member, for example, a carbon particle layer containing carbon particles may be provided on each of the catalyst layers 6a and 6b-side surfaces of the gas diffusion layers 5a and 5b.

Preferably, each of the gas diffusion layers 5a and 5b is a porous body formed of a material having electrical conductivity, more preferably, is a fiber material including paper, unwoven fabric, woven fabric, knitted fabric or a net. As the material having electrical conductivity, for example, a carbon material and a metal material are mentioned.

In the case where each of the gas diffusion layers 5 is formed of the fiber material, a half value r of an average inter-fiber distance on the surface thereof is preferably 100 μm or less, more preferably, 50 μm or less. Moreover, the half value r of the above-described average inter-fiber distance is still more preferably 20 μm or less, far more preferably 15 μm or less, particularly preferably 10 μm or less, most preferably 5 μm or less. The half value r of the average inter-fiber distance, which is defined here, refers to a half distance of the average inter-fiber distance. That is to say, in the case where each of the gas diffusion layers is formed of a plain-woven fiber material, the half value r of the average inter-fiber distance refers to a half of a distance of two adjacent vertical lines or horizontal lines.

Note that, in FIG. 3, the above-described gas diffusion layers 5a and 5b and the above-described catalyst layers 6a and 6b are separate layers. However, each of the gas diffusion layers and each of the catalyst layers may be integrated with each other, and may be formed into a single layer.

[Aspect Ratio]

In general, each of the catalyst layers of the fuel cell is formed into the substantially rectangular shape, and has a structure in which the fuel gas, the oxidant gas, a coolant and the like are introduced from one of two opposed sides, and are discharged from the other side thereof. In this specification, a distance between the above-described two opposed sides is defined as the flow passage length, and a distance (width) in a direction perpendicular to a direction where the fuel gas, the oxidant gas, the coolant and the like flow is defined as the flow passage width. Moreover, the respective directions are sometimes referred to as a flow passage direction and a width direction.

Specifically, in the membrane electrode assembly 3 that forms the substantially rectangular shape, as shown in FIG. 4(B), a distance in the direction (direction indicated by an arrow Me where the oxidant gas flows is defined as the flow passage length W1, and a distance in the direction (direction indicated by an arrow M2) perpendicular to the direction where the oxidant gas flows is defined as the flow passage width W2. In this case, an aspect ratio R of the membrane electrode assembly 3 is defined by: R=flow passage length (W1)/flow passage width (W2). Strictly speaking, the aspect ratio of the membrane electrode assembly 3 is a ratio (flow passage length/flow passage width) of the flow passage length (W1) with respect to the flow passage width (W2) in each of the catalyst layers 6a and 6b which are provided in an active area where the power generation occurs. Note that, in this embodiment, the membrane electrode assembly 3 is a concept including the catalyst layers 6a and 6b, and accordingly, the aspect ratio in this embodiment is expressed below as the aspect ratio R of the membrane electrode assembly 3 for the sake of convenience.

Note that, in the above description, the distance in the direction where the oxidant gas flows is defined as the flow passage length W1, the distance in the direction perpendicular to the direction where the oxidant gas flows is defined as the flow passage width W2, and the aspect ratio R of the membrane electrode assembly 3 is defined as: R=flow passage length (W1)/flow passage width (W2). However, a distance in a direction where the fuel gas flows on the anode side or in a direction where the coolant flows in a cooling layer may be defined as the flow passage length W1, a distance in a direction perpendicular to the direction where the fuel gas flows may be defined as the flow passage width W2, and the aspect ratio R of the membrane electrode assembly 3 may be defined as: R=flow passage length (W1)/flow passage width (W2).

In this embodiment, the aspect ratio R of the membrane electrode assembly 3 is 0.01 or more to less than 2. A lower limit value of the aspect ratio R is preferably 0.05 or more, more preferably 0.1 or more, still more preferably 0.2 or more. Meanwhile, an upper limit value of the aspect ratio is preferably less than 1.5, more preferably less than 1.2 still more preferably less than 1.0, far more preferably less than 0.6, particularly preferably less than 0.4, most preferably less than 0.3. In the case where the aspect ratio R is less than 0.01, then an outer shape of the fuel cell becomes too slender, and accordingly, there is a possibility that some obstacle may occur in the event where the fuel cell is considered to be mounted on a vehicle, and so on. Meanwhile, in the case where the aspect ratio R becomes 2 or more, then a horizontal direction equivalent diameter to be described later is increased, and accordingly, a capacity of flow passages, which is necessary per unit area of the membrane electrode assembly, becomes excessive. Therefore, it becomes difficult to achieve the miniaturization of the fuel cell, which is the object of the invention of this application.

Figure 2:
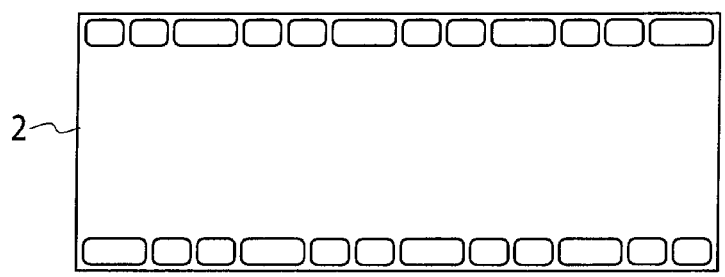
FIGS. 2(A) to 2(C) show a fuel cell single cell that composes the fuel cell of this embodiment.
Figure 2:
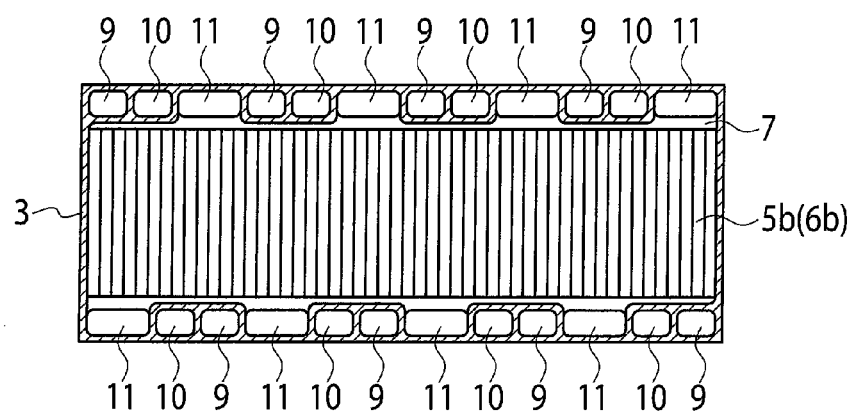
Figure 2:
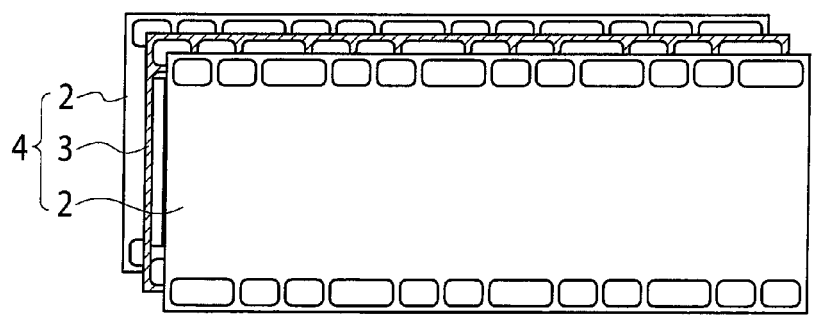
Figure 7:
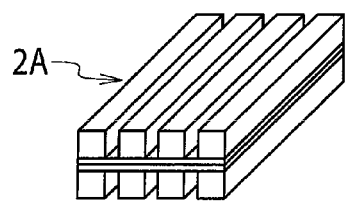
FIG. 7(A) is a view showing a separator with a high aspect ratio.
FIG. 7(B) is a view showing a separator with a low aspect ratio.
FIG. 7(C) is a view showing a separator with a low aspect ratio and a low flow passage height.
Figure 7:
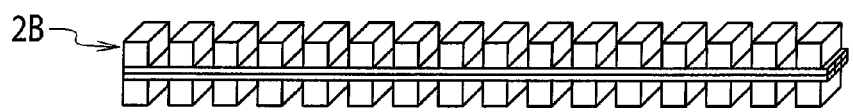
Figure 7:

When described in detail, as shown in FIG. 2, in the case where the membrane electrode assembly 3 is a rectangle with the aspect ratio R of 0.01 or more to less than 2, then the shape of each separator 2 is also formed into the rectangle so as to be matched with the membrane electrode assembly 3. Then, for example, as shown in FIG. 7(A), in a separator 2A, in the case where the aspect ratio is high (R is 2 or more), then the flow passage length also becomes long, and accordingly, the pressure loss is increased. As opposed to this, as shown in FIG. 7(B), in a separator 2B, in the case where the aspect ratio is low (R is 0.01 or more to less than 2), then the flow passage length becomes short, and accordingly, the pressure loss is reduced in comparison with the separator 2A. That is to say, even in the case where an area is the same as that of the separator 2A, and a flow rate to the flow passages is the same as that of the separator 2A, the pressure loss can be reduced by lowering the aspect ratio R as in the separator 2B. Therefore, as shown in FIG. 7(C), even in the case where the aspect ratio R is reduced, and a height of the flow passages is lowered, the pressure loss equivalent to that of the separator 2A in FIG. 7(A) can be maintained, and in addition, a height of the separator itself can be lowered.

Moreover, a cross-sectional area becomes smaller in flow passages of a separator 2C of FIG. 7(C) than in flow passages of the separator 2B of FIG. 7(B), and accordingly, a flow speed of reaction gas becomes faster in the flow passages of the separator 2C. As a result, produced water present in the flow passages can be blown away by the reaction gas, and accordingly, flooding can be suppressed. In particular, preferably, such a configuration as in the separator 2C is applied to a cathode side where the produced water is prone to build up; however, even in the case where the configuration described above is applied to an anode side or to the coolant, such application can contribute to the miniaturization of the fuel cell.

Here, in the fuel cell of this embodiment, preferably, the direction where the fuel gas flows is parallel to the direction where the oxidant gas flows. However, it is also possible to set the direction where the fuel gas flows to be perpendicular (cross flow) to the direction where the oxidant gas flows. In the case where the direction where the fuel gas flows and the direction where the oxidant gas flows are parallel to each other, both cases are possible, where both of the directions are the same direction (co-flow) and reverse directions (counter flows) to each other; however, the counter flows are preferable.

Moreover, in this embodiment, preferably, the direction where the coolant flows is parallel to the direction where the oxidant gas flows; however, it is also possible to set the direction where the coolant flows to be perpendicular (cross flow) to the direction where the oxidant gas flows. In the case where the direction where the coolant flows and the direction where the oxidant gas flows are parallel to each other, both cases are possible, where both of the directions are the same direction (co-flow) and reverse directions (counter flows) to each other; however, the co-flow is preferable.

[Manifold]

In this embodiment, as supply means for the fuel gas, the oxidant gas and the coolant, which are necessary for the fuel cell, two sets or more of manifolds for the oxidant gas, the fuel gas and the coolant can be provided on outer circumferential portions or outsides of two opposed sides of the membrane electrode assembly. By providing two or more sets of the manifolds, it becomes possible to supply the gases and the coolant uniformly in the width direction also in the fuel cell of this embodiment, which is wider in the width direction.

Figure 4:
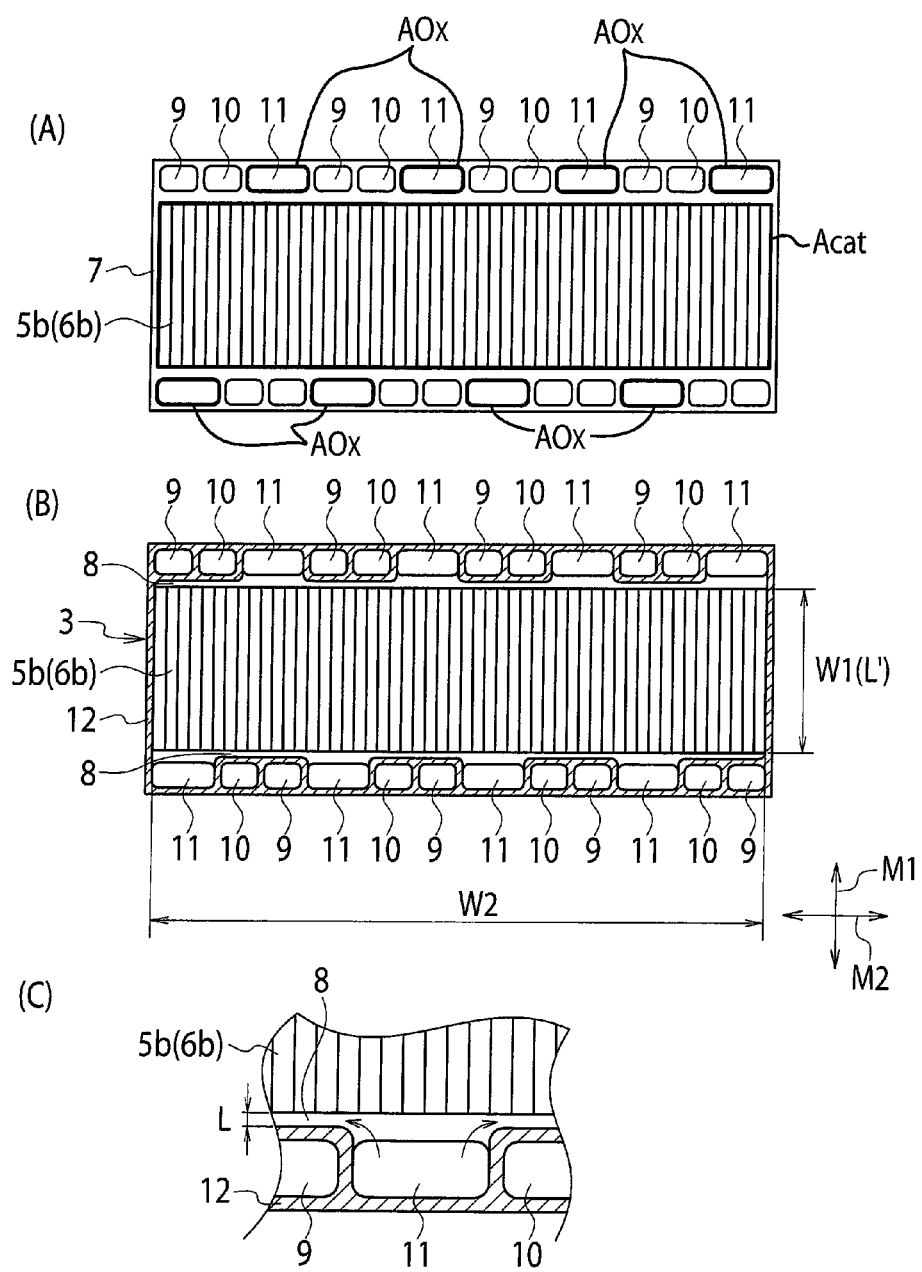

FIG. 4 shows an example where plural sets are formed on the outer circumferential portions of two opposed sides (long sides) of the membrane electrode assembly 3, each set being composed of a fuel gas manifold 9, a coolant manifold 10 and an oxidant gas manifold 11. The fuel gas manifold 9 and the oxidant gas manifold 11, which are described above, are provided while sandwiching the coolant manifold 10 therebetween. In FIG. 4, from a left side therein toward a right side therein, the fuel gas manifold 9, the coolant manifold 10 and the oxidant gas manifold 11 are arranged in this order, and these three types of manifolds are arranged repeatedly in plural number. From another viewpoint, on the outer circumferential portions of the membrane electrode assembly, the fuel gas manifolds 9 and the oxidant gas manifolds 11 are arranged alternately with each other while sandwiching the coolant manifolds 10 therebetween.

Note that, in FIG. 3 and FIG. 4, the pluralities of fuel gas manifolds 9, coolant manifolds 10 and oxidant gas manifolds 11 are provided on outer circumferential portions of two opposed sides (long sides) of the electrolyte membrane 7 that composes the membrane electrode assembly 3. However, it is not always necessary that the above-described manifolds be provided in the electrolyte membrane. For example, along an outer edge of the electrolyte membrane having the same planer shape as that of the catalyst layer, a resin-made carrier sheet provided with the above-described manifolds is arranged. Then, the outer edge of the electrolyte membrane and an inner edge of the carrier sheet are hermetically adhered to each other. In such a way, it is possible to develop the same function as that of the membrane electrode assembly 3 of FIG. 3.

Figure 5:
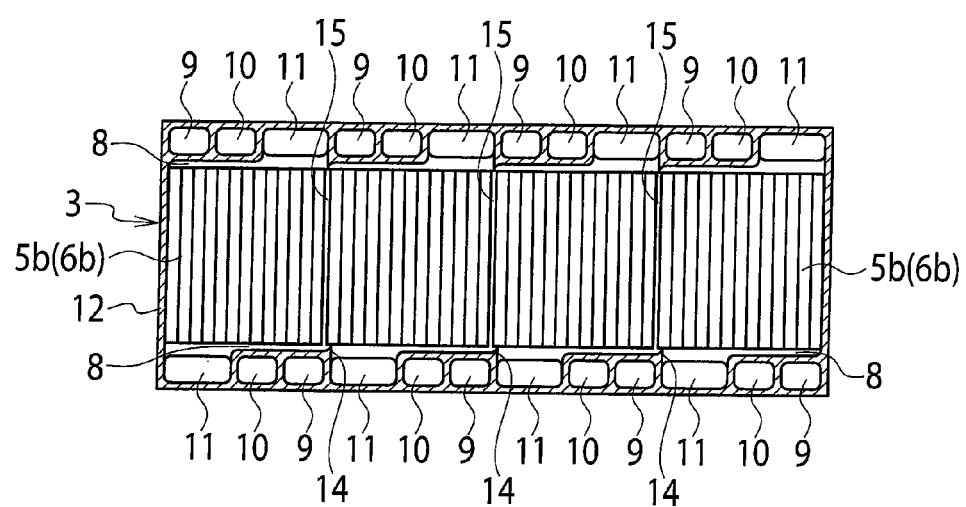
FIG. 5 is a plan view showing the membrane electrode assembly in which the widened portion and a gas diffusion layer are divided in parallel to a flow passage direction of the membrane electrode assembly.

Moreover, as shown in FIG. 4(B), FIG. 4(C) and FIG. 5, seal members 12 are individually provided on outer circumferential edges of surfaces which serve as the cathode side and anode side of the above-described membrane electrode assembly 3. Specifically, on the outer circumferential edge of the surface that serves as the cathode side of the electrolyte membrane 7, the seal member 12 is provided so as to surround the entire outer circumference thereof, and in addition, so as to surround peripheries of the fuel gas manifolds 9 and the coolant manifolds 10. However, the seal member 12 is not provided on peripheries of the oxidant gas manifolds 11. Meanwhile, on the outer circumferential edge of the surface that serves as the anode side of the electrolyte membrane 7, though not shown, the seal member 12 is provided so as to surround the entire outer circumference thereof, and in addition, so as to surround the oxidant gas manifolds 11 and the coolant manifolds 10. However, the seal member 12 is not provided on peripheries of the fuel gas manifolds 9.

The above-described seal member 12 has a switching function to select which fluid (fuel gas, oxidant gas, coolant) is to be flown through the active area of the membrane electrode assembly 3. For example, in FIG. 4(B), the seal member 12 is open on front surfaces of the oxidant gas manifolds 11, and accordingly, it is understood that FIG. 4(B) shows the cathode side of the membrane electrode assembly 3.

In this embodiment, preferably, a sum AOx of cross-sectional areas of the oxidant gas manifolds 11 is 1% or more to 50% or less of a catalyst area Acat of the cathode catalyst layer 6b. That is to say, in the membrane electrode assembly 3 shown in FIG. 4(A), preferably, a sum total AOx of the flow passage areas of the plurality of oxidant gas manifolds 11 is 1% or more to 50% or less of the catalyst area Acat of the cathode catalyst layer 6b. Moreover, the sum AOx of the cross-sectional areas of the oxidant gas manifolds 11 is more preferably 10% or more to 40% or less of the catalyst area Acat, still more preferably 20% or more to 30% or less thereof. In the case where AOx is less than 1%, then it is possible that distribution characteristics of the oxidant gas in the width direction M2 of the membrane electrode assembly 3 may be lowered, and in addition, that a ventilation pressure loss in the manifolds may be increased. On the contrary, in the case where AOx exceeds 50%, the capacity of the fuel cell is increased, and accordingly, this is not preferable.

Moreover, in a similar to the above, preferably, a sum ARe of cross-sectional areas of the fuel gas manifolds 9 is 1% or more to 30% or less of a catalyst area Acat of the anode catalyst layer 6a. Moreover, the sum ARe of the cross-sectional areas of the fuel gas manifolds 9 is more preferably 5% or more to 20% or less of the catalyst area Acat of the anode catalyst layer 6a, still more preferably, 10% or more to 15% or less thereof. In the case where ARe is less than 1%, then it is possible that distribution characteristics of the oxidant gas in the width direction M2 of the membrane electrode assembly 3 may be lowered, and in addition, that a ventilation pressure loss in the manifolds may be increased. On the contrary, in the case where ARe exceeds 30%, the capacity of the fuel cell is increased, and accordingly, this is not preferable.

Moreover, in this embodiment, preferably, the oxidant gas manifolds 11 are resultants obtained by division into a plurality with respect to one active area (region where the catalyst layers 6a and 6b are present). Preferably, the number NOx of manifold divisions for the oxidant gas is 2 or more to 100 or less, more preferably, 5 or more to 20 or less. Incidentally, in FIGS. 4(A) and 4(b), in one of the long sides of the membrane electrode assembly 3, the number of divisions of the oxidant gas manifolds 11 is four. That is to say, in this embodiment, in one flow passage width (W2)-side side of the membrane electrode assembly 3, preferably, the number of divisions of the oxidant gas manifolds 11 is NOx. In the case where NOx described above is less than 2, then it is possible that it may be difficult to introduce the reaction gas and the coolant into the membrane electrode assembly 3 easily and uniformly. Meanwhile, in the case where NOx exceeds 100, though it causes no more than a hindrance in the case where the fuel cell is extremely large, an area of the seal member, which is necessary for each of the manifolds, is increased. Therefore, it is possible that it may be difficult to achieve the miniaturization as the object of this application.

Moreover, in a similar way to the above-described oxidant gas manifolds 11, preferably, the fuel gas manifolds 9 are resultants obtained by division into a plurality with respect to one active area. Preferably, the number NRe of manifold divisions for the fuel gas is 2 or more to 100 or less, more preferably, 5 or more to 20 or less. Incidentally, in FIGS. 4(A) and 4(b), in one of the long sides of the membrane electrode assembly 3, the number of divisions of the fuel gas manifolds 9 is four. That is to say, in this embodiment, in one flow passage width (W2)-side side of the membrane electrode assembly 3, preferably, the number of divisions of the fuel gas manifolds 9 is NRe. In the case where NRe is less than 2, then it is possible that it may be difficult to introduce the reaction gas and the coolant into the membrane electrode assembly easily and uniformly. In the case where NRe exceeds 100, though it causes no more than a hindrance in the case where the fuel cell is extremely large, an area of the seal member, which is necessary for each of the manifolds, is increased. Therefore, it is possible that it may be difficult to achieve the miniaturization as the object of this application.

[Widened Portion]

In the case where the fuel gas or the coolant is flown in parallel to the oxidant gas, preferably, all of the gas or the coolant is uniformly supplied in the width direction of the membrane electrode assembly. Therefore, between the respective manifolds 9, 10 and 11 described above and the catalyst layers 6a and 6b, as shown in FIGS. 4(B) and 4(C), there can be formed widened portions 8 which serve as flow passages for supplying the oxidant gas or the fuel gas to the catalyst layers 6a and 6b. The widened portions 8 are formed by providing a fixed gap (distance) L between the respective manifolds 9, 10 and 11 and the catalyst layers 6a and 6b in the membrane electrode assembly. For example, the widened portions 8 in the oxidant gas specifically correspond to regions between the seal member 12 that surrounds the peripheries of the fuel gas manifolds 9 and the coolant manifolds 10 and the catalyst layers 6a and 6b (actually, the gas diffusion layers 5a and 5b provided on the catalyst layers 6a and 6b).

The widened portions 8 as described above are provided, whereby, as shown in FIG. 4(C), the oxidant gas that flows out from the oxidant gas manifolds 11 diffuses in the width direction M2 of the membrane electrode assembly 3 through the widened portions 8. Thereafter, the oxidant gas that has diffused is supplied to the gas diffusion layer 5b and the catalyst layer 6b. Therefore, it becomes possible to efficiently perform the power generation by the whole of the active area of the MEA.

The length L of the widened portions 8 is set at 1% or more to 30% or less of a flow passage length L' in the gas flow direction M1 of the catalyst layers 6a and 6b (including the gas diffusion layers 5a and 5b). Moreover, the length L of the widened portions 8 is more preferably 5% or more to 20% or less of the flow passage length L', still more preferably, 10% or more to 15% or less thereof. In the case where the length L of the widened portions 8 is less than 1% of the flow passage length L', then the loss of the pressure for supplying the oxidant gas or the fuel gas to front surfaces of the respective manifolds 9 and 11 adjacent thereto is increased, and accordingly, this is not preferable. Moreover, in the case where the length L of the widened portions 8 exceeds 30% of the flow passage L', it becomes difficult to miniaturize the fuel cell, and accordingly, this is not preferable.

[Separator]

The above-described separators 2 have a function to collect electrons taken out from the anode-side catalyst layer 6a to the anode-side gas diffusion layer 5a, and to send out the collected electrons to an external load circuit. Moreover, the separators 2 have a function to distribute the electrons, which are returned from the external load circuit, to the cathode-side gas diffusion layer 5b, and to transmit the electrons to the cathode-side catalyst layer 6b. Moreover, in the case where surfaces of the gas diffusion layers 5a and 5b, which are on opposite sides with the catalyst layers 6a and 6b, do not have a gas shielding function, then the separators 2 carry the gas shielding function by being adhered to the gas diffusion layers 5a and 5b. Moreover, the separators 2 carry a temperature adjustment function (cooling function) for the fuel cell by composing cooling layers (coolant flow passages) according to needs.

As each of the above-described separators 2, for example, a non-porous body having electric conductivity therein is preferable. Specifically, preferable are: metal foil such as aluminum foil, gold foil, nickel foil, copper foil and stainless steel foil; and a carbon foil formed of a carbon material such as natural graphite.

Here, in FIG. 2, a plurality of manifolds are provided on outer circumferential portions of two opposed sides of each of the separators 2; however, it is not always necessary that the manifolds be provided in each of the separators. For example, along an outer edge of each of the separators having the same planer shape as that of the catalyst layers 6a and 6b, a resin-made carrier sheet provided with the manifolds is arranged. Then, the outer edge of the separator and an inner edge of the carrier sheet are hermetically adhered to each other. In such a way, it is possible to develop the same function as that of the separator of FIG. 2. Note that a function of the manifolds of each of the separators 2 is equivalent to the function of the manifolds of the membrane electrode assembly 3.

[Flow Passage]

In the above-described separator 2, as shown in FIG. 6(A), flow passages 13 for flowing the oxidant gas or the fuel gas therethrough can be formed on a surface of the separator 2. Moreover, in the above-described separator 2, flow passages (not shown) for flowing the coolant therethrough can be formed in an inside of the separator 2 according to needs.

A cross-sectional shape of the flow passages provided in the separator 2 is composed of: projections called ribs; and recesses called channels. Among them, the ribs contact the gas diffusion layers, thereby collecting the electrons generated in the catalyst layer. In FIG. 6(B), reference symbol a denotes a flow passage height (rib height) of the flow passages 13, reference symbol b denotes a channel width of the flow passages 13, and reference symbol c denotes a rib width of the flow passages 13.

Preferably, a horizontal shape of the above-described flow passages 13 is formed of straight lines which connect the two opposed sides of the substantially rectangular catalyst layer to each other by a shortest distance. In this case, for example, as shown in FIG. 4(B), in the case where the oxidant gas is supplied from the oxidant gas manifolds 11 provided above, then the oxidant gas diffuses in the width direction M2 through the widened portions 8 on the upper side, and thereafter, flows to the lower side through the flow passages 13 parallel to the gas flow direction M1. Then, the oxidant gas passes through the widened portions 8 on the lower side, and is discharged from the oxidant gas manifolds 11 provided on the lower side. Therefore, the oxidant gas can be efficiently dispersed into the gas diffusion layer 5b and the cathode catalyst layer 6b.

Note that, within the scope without damaging the object of the present invention, the above-described flow passages 13 can also be formed of straight lines or curved lines with the shortest distance or more. In this case, the fuel gas and the oxidant gas, which are necessary for the fuel cell reaction, are uniformly distributed to the entire surfaces of the catalyst layers through the gas diffusion layers, and accordingly, coverage can be made for the entire surfaces of the catalyst layers.

As a manufacturing method of the flow passages 13, means conventionally known in public, such as pressing and cutting, can be used.

As mentioned above, the flow passages 13 through which each of the reaction gases flows can be formed of the ribs and the channels, which are provided on the surface of the separator 2. However, the flow passages are not limited to this. In the case where an equivalent diameter in the flow passage direction in such a porous structure that composes each of the gas diffusion layers 5a and 5b is such a specific equivalent diameter as will be described later, a function equivalent to that of the flow passages 13 can be imparted. In this case, it is not necessary to form the flow passages 13, which is composed of the ribs and the channels, on the surface of the separator 2, and accordingly, the separator can be smoothened. Moreover, the above-described flow passages may be provided on both of the gas diffusion layers 5a and 5b and the separators 2.

[Horizontal Direction Equivalent Diameter]

In this embodiment, the fuel cell is formed into such a low-aspect structure, and at the same time, the horizontal direction equivalent diameter of the flow passages provided on at least one of the gas diffusion layer and the separator is restricted within a specific range. In such a way, while maintaining the anti-flooding characteristics, it is possible to comprehensively miniaturize the fuel cell stack including the capacity of the manifolds. Here, the horizontal direction equivalent diameter refers to an inner diameter of a flow passage of an imagined circular pipe in which there occurs the same pressure loss as a pressure loss generated in such a manner that a fluid (reaction gas, coolant) flows in a fixed-form or unfixed-form flow passage.

When described in detail, this embodiment has a feature in that the horizontal direction equivalent diameter D of the flow passages 13 formed on at least one of the gas diffusion layer 5a or 5b and the separator 2 satisfies the following Expression (1).

$$D = B \times (R \times A_{cat})^{1/3} \quad \text{Expression (1)}$$

where Acat is a catalyst area (cm$^2$) of the above-described membrane electrode assembly, and B is a constant of 0.005 or more to 0.2 or less.

Figure 6:
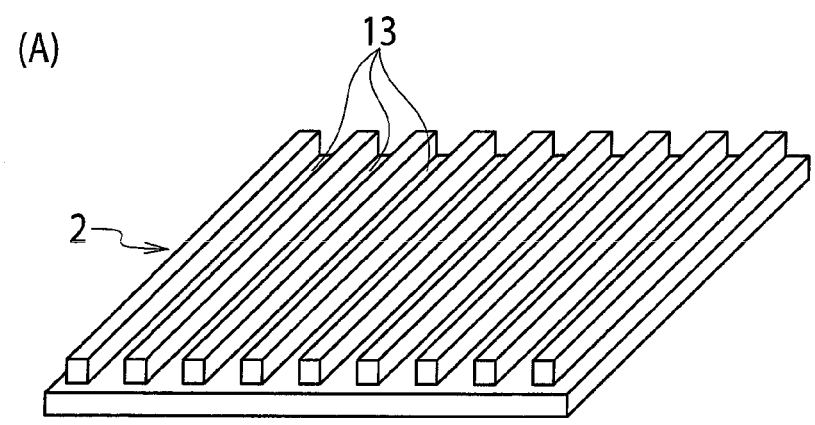
FIGS. 6(A) and 6(B) show the separator.
Figure 6:
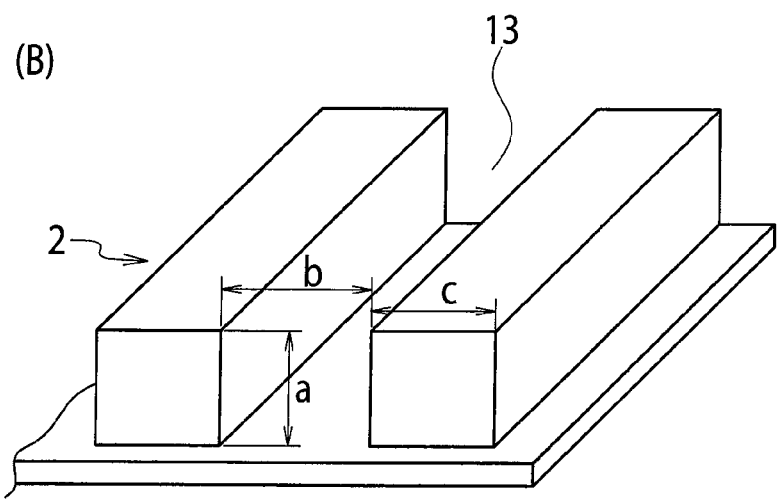

Here, the equivalent diameter (also referred to as a representative length) is equivalent to the inner diameter of the flow passage of the imagined circular pipe in which there occurs the same pressure loss as the pressure loss generated in such a manner that the fluid flows in the unfixed-form flow passage. For example, as shown in FIG. 6, in the case where a cross section of the flow passages 13 for the reaction gas is rectangular, the equivalent diameter can be obtained by: D=4ab/(2a+2b). Here, reference symbol a is a length of a short side of the above-described flow passages, and reference symbol b is a length of a long side of the flow passages.

The horizontal direction equivalent diameter D of the gas diffusion layer 5a or 5b or the flow passages 13 in this specification is defined as follows: 1) in the case where the flow passages 13 are formed on the gas diffusion layer 5a or 5b, the horizontal direction equivalent diameter D is an equivalent diameter in the flow passage direction in the porous structure that composes the gas diffusion layer 5a or 5b; and 2) in the case where the flow passages 13 are formed on the surface of the separator, the horizontal direction equivalent diameter D is a larger one of an equivalent diameter of the flow passages 13 and the equivalent diameter in the flow passage direction in the porous structure that composes the gas diffusion layer.

Reference symbol B described in the above-described Expression (1) is a constant of 0.005 or more to 0.2 or less. However, a lower limit value of the constant B is preferably 0.01, more preferably 0.02 or more, particularly preferably 0.05 or more. Meanwhile, an upper limit value of the constant B is preferably 0.1 or less, more preferably 0.09 or less, particularly preferably 0.08 or less. When the constant B is smaller than 0.005, the pressure loss becomes excessive, and accordingly, this is not preferable. When the constant B is larger than 0.2, the height of the flow passages or the gas diffusion layer becomes excessive, and accordingly, this is not preferable.

In the case where the flow passages 13 are formed on the separator, appropriate height and width of the flow passages 13 can be obtained from the above-described relational expression De=4ab/(2a+2b). In the case where reference symbol a is the height of the flow passage, and reference symbol b is the width of the flow passage, there is a relationship De=2a when a value of b is infinitely large. Hence, a ratio b/a is preferably 1.2 or more, more preferably 1.3 or more, still more preferably 1.4 or more, far more preferably 1.5 or more.

[Electrolyte Membrane]

The electrolyte membrane 7 is a kind of a permselective membrane having a function to transport protons and insulate electrons. The electrolyte membrane 7 as described above is broadly classified into a fluorine electrolyte membrane and a hydrocarbon electrolyte membrane in accordance with types of ion exchange resin as a constituent material thereof. Among them, the fluorine electrolyte membrane has C—F bonding, and accordingly, excellent in heat resistance and chemical stability. For example, for the electrolyte membrane 7, there can be used a perfluorosulfonic acid membrane known by a product name Nafion (registered trademark, made by DuPont Corporation).

[Catalyst Layer]

The catalyst layer (cathode catalyst layer) 6b provided on the cathode side is a layer containing an electrode catalyst, which is composed by supporting a catalyst component thereon, and containing ionomer. The electrode catalyst has a function to promote a reaction (oxygen reduction reaction) of generating water from protons, electrons and oxygen. The electrode catalyst has a structure composed in such a manner that the catalyst component such as platinum is supported, for example, on a surface of an electrically conductive support made of carbon or the like.

The catalyst layer (anode catalyst layer) 6a provided on the anode side is a layer containing an electrode catalyst, which is composed by supporting a catalyst component thereon, and containing ionomer. The electrode catalyst has a function to promote a reaction (hydrogen oxidation reaction) of dissociating hydrogen into protons and electrons. The electrode catalyst has a structure composed in such a manner that the catalyst component such as platinum is supported, for example, on a surface of an electrically conductive support made of carbon or the like.

[Division of Widened Portion and Gas Diffusion Layer]

In this embodiment, the above-described widened portions 8 may be divided in response to the number of divisions of the manifolds 9, 10 and 11. For example, in FIG. 5, the widened portions 8 are divided in parallel to the flow passage direction M1 of the membrane electrode assembly 3 by widened portion dividing portions 14 in each of which a part of the seal member 12 is protruded toward the gas diffusion layer 5a or 5b. Preferably, the number of divisions of the widened portions 8 is matched with the above-described number NOx of divisions of the manifolds. Then, in FIG. 5, the number of divisions of the widened portions is set at 4 in matching with the number of divisions of the manifolds for the oxidant gas. By the division of the widened portions 8, which is as described above, it becomes possible to restrict the supply of the fluid from each of the manifolds to a specific flow passage width. As a result, even in the case where the supply of the fluid varies to a degree more than expected, the fluid can be supplied uniformly in the width direction M2 of the membrane electrode assembly 3.

Moreover, in this embodiment, the gas diffusion layers 5a and 5b may also be divided in response to the number of divisions of the manifolds 9, 10 and 11. For example, gas impermeable materials (slits) are inserted into each of the gas diffusion layers 5a and 5b, and gas diffusion layer dividing portions 15 are formed, whereby each of the gas diffusion layers 5a and 5b can be divided in parallel to the flow passage direction M1 of the membrane electrode assembly 3. Preferably, the number of divisions of each of the gas diffusion layers 5a and 5b is matched with the above-described number NOx of divisions of the manifolds. Then, in FIG. 5, the number of divisions of each of the gas diffusion layers is set at 4 in matching with the number of divisions of the manifolds for the oxidant gas. By the division of each of the gas diffusion layers 5a and 5b, which is as described above, it becomes possible to restrict the fluid from moving in the width direction M2 in the inside of each of the gas diffusion layers. As a result, even in the case where the supply of the fluid varies to a degree more than expected, the fluid can be supplied uniformly in the width direction M2 of the membrane electrode assembly 3.

Meanwhile, as shown in FIG. 6(A), in the case where the straight flow passages 13 are used in the separator 2, the gas does not substantially flow in a direction other than the flow passage direction. Therefore, even in the case where the gas impermeable materials are inserted into the gas diffusion layer, it is not necessary to insert the gas impermeable materials into the flow passages themselves of the separator 2. Hence, in FIG. 5, a special structure is not required in the flow passages of regions in contact with the gas diffusion layer dividing portions 15.

[Mechanism of Fuel Cell]

A mechanism of the polymer electrolyte fuel cell (PEFC) 1 according to this embodiment is as follows. Specifically, protons and electrons are generated from hydrogen supplied to the anode catalyst layer 6a. The protons generated in the anode move in the inside of the electrolyte membrane 7, and reach the cathode catalyst layer 6b. Meanwhile, the electrons generated in the anode transmit through an electrically conducting wire (conductor), and are taken out from the fuel cell. Then, the above-described electrons consume electrical energy in the external load circuit, thereafter, transmit through an electrically conducting wire (conductor), return to the cathode, and react with oxygen supplied to the cathode catalyst layer 6b, thereby generating water.

[Operations of Fuel Cell]

Operations of the fuel cell are performed by supplying hydrogen to one electrode (anode) and supplying oxygen or air to the other electrode (cathode). A higher operation temperature of the fuel cell is preferable since catalytic activity thereof is increased; however, frequently, the fuel cell is operated at 50° C. to 100° C. at which moisture management is easy.

[Vehicle that Mounts Fuel Cell Thereon]

Figure 8:
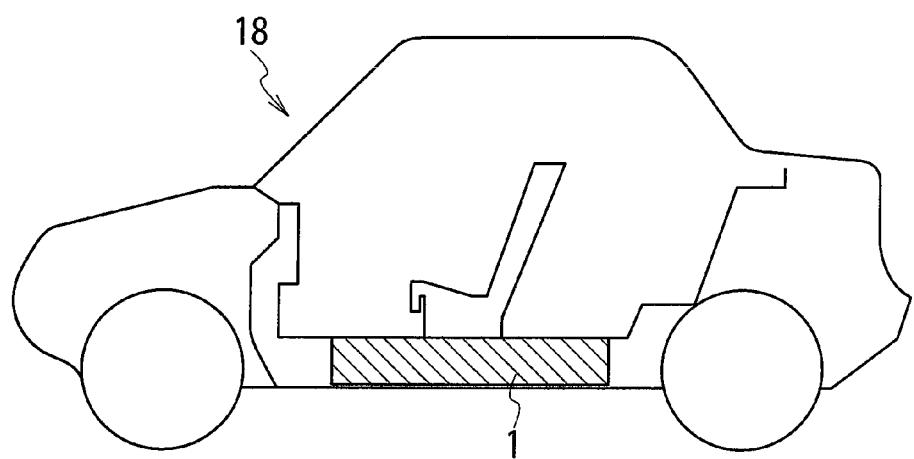
FIG. 8 is a view showing an example of a vehicle that mounts the fuel cell of this embodiment thereon.

FIG. 8 shows an example of a vehicle that mounts the fuel cell of this embodiment thereon. A vehicle 18 shown in FIG. 8 mounts the fuel cell of this embodiment, which serves as a drive source, under a floor thereof. Such a vehicle 18 that mounts the fuel cell 1 thereon exhibits a high output since the fuel cell 1 is a polymer electrolyte fuel cell (PEFC) or a stack fuel cell, which is extremely excellent in output performance.

Effects of this Embodiment

As mentioned above, the fuel cell of this embodiment has a feature in that each of the membrane electrode assembly and the separators adopts the low-aspect structure with an aspect ratio of less than 2, and that the horizontal direction equivalent diameter of the flow passages, which is introduced from the above-described aspect ratio and the area of the catalyst layer, is within the predetermined range. In such a way, while maintaining the same pressure loss and the same gas flow rate as those of the conventional fuel cell, the fuel gas, the oxidant gas, water vapor, the produced water and the like can be transported at a smaller cell pitch (flow passage height). Hence, the fuel cell can be provided, which is capable of the miniaturization while maintaining the pressure loss necessary for the development of the anti-flooding characteristics. In other words, a fuel cell with a higher output density can be realized.

Moreover, in accordance with the fuel cell of this embodiment, as supply means for the fuel gas, the oxidant gas and the coolant, which are necessary for the fuel cell, the pluralities of manifolds for the oxygen gas and the fuel gas are individually arranged alternately with each on the outer circumferential portions or outsides of the two opposed sides of the membrane electrode assembly. Therefore, even in the case where the fuel cell has the low-aspect structure wide in the width direction, the respective gases and fluids can be supplied uniformly in the width direction of the catalyst layers (active areas) of the membrane electrode assembly. In addition, in accordance with the fuel cell of this embodiment, the widened portions are provided between the manifolds and catalyst layers, and accordingly, the respective gases and fluids can be supplied more uniformly in the width direction of the catalyst layers (active areas) of the membrane electrode assembly.

Moreover, in this embodiment, the length of the widened portions is within the specific range (1% or more to 30% or less) with respect to the flow passage length. Therefore, the capacity of the widened portions can be reduced without causing the excessive pressure loss.

Moreover, the sum of the cross-sectional areas of the respective manifolds for the oxidant gas and the fuel gas is within the specific range (1% or more to 30% or less) with respect to the area of the catalyst layer. Therefore, the capacity of the manifolds can be reduced without causing the excessive pressure loss.

Moreover, the respective manifolds for the oxidant gas and the fuel gas adopt the specific number of divisions (within a range of 3 or more to 100 or less). Therefore, good distribution characteristics can be realized without causing the excessive pressure loss.

Then, in accordance with the fuel cell of this embodiment, the widened portions are divided in parallel to the flow passage direction of the membrane electrode assembly, and the number of divisions thereof is made specific. In such a way, an influence given among the adjacent manifolds is blocked, and good distribution characteristics for the respective gases to the catalyst layers and the gas diffusion layers can be realized.

Furthermore, the gas diffusion layers are divided in parallel to the flow passage direction of the membrane electrode assembly, and the number of divisions thereof is made specific. In such a way, the influence given among the adjacent manifolds is blocked, and good distribution characteristics for the respective gases to the catalyst layers can be realized.

The vehicle of this embodiment includes the fuel cell miniaturized while maintaining the anti-flooding characteristics as mentioned above, and accordingly, becomes a vehicle excellent in mountability of the fuel cell, productivity and cost.

A description is made below more in detail of the present invention by examples and comparative examples; however, the present invention is not limited to these examples.

Example 1

First, 5 parts (carbon average particle diameter: approximately 3 μm) of Acetylene Black made by Denki Kagaku Kogyo Kabushiki Kaisha and 1 part of Polyflon D-1E made by Daikin Industries, Ltd. were mixed with each other, whereby ink slurry was prepared. Next, the above-described ink slurry was coated on Carbon Paper TGP-H-060 made by Toray Industries, Inc., followed by baking at 350° C., whereby a GDL having a carbon particle layer on a surface thereof was created. A thickness of the obtained GDL was 0.2 mm, and a shape of the GDL was a rectangle with a width 595 mm×a length 52 mm.

Next, catalyst layers containing platinum-supported carbon were coated on both surfaces of an electrolyte membrane (polymer electrolyte membrane Nafion 211 made by DuPont Corporation), whereby a CCM was created. A shape of the CCM was a rectangle with a width 606 mm×a length 88 mm. A shape of the catalyst layers was a width 593 mm×a length 50 mm. That is to say, an aspect ratio R of the catalyst layers was 0.084.

Moreover, metal-made separators, each of which included a plurality of flow passages, were prepared. A shape of the separators was a rectangle with a width 606 mm×a length 88 mm. On each of the separators, 1706 pieces of the flow passages rectangular in cross section, in which a flow passage height was 0.1 mm, a rib width was 0.15 mm, a channel width was 0.20 mm, and a rib pitch was 0.35 mm, were formed. These flow passages were molded in parallel to a flow passage direction, that is, to short sides of the separator. Then, an equivalent diameter D of the flow passages was: 4×0.10× 0.20/(2×0.10+2×0.20)=0.13 (mm).

Moreover, on long side-side outer circumferential portions of the above-described separator, for each long side thereof, there were provided: 15 pieces of manifolds with a width 17 mm×a length 7 mm; and 2 pieces of half manifolds with a width 7.3 mm×7 mm. The half manifolds were arranged outside of the 15 pieces of manifolds. From the above-mentioned Expression (1), a horizontal direction equivalent diameter D in this example is obtainable as 0.029 mm to 0.29 mm, and the above-described equivalent diameter is within this range.

On each of end plates, two pipe-like external manifolds were provided on long side-side outer circumferential portions on a surface thereof opposite with a surface in contact with a current collector, that is, on the same lines as manifold rows of the separator. The external manifolds are pipe-like structures having a function to supply gas to the manifold rows, and are drilled with holes with an inner diameter of 25 mm. Then, the two external manifolds individually serve for gas supply and gas discharge. In the end plates, there are two types, which are: an air purpose (cathode); and a hydrogen purpose (anode). The external manifolds of the end plate are closed alternately, whereby the hydrogen and the air can supplied alternately to the manifolds of the separator. On peripheries of the respective manifolds and on an outer circumference of the fuel cell, a silicon rubber-made seal member was arranged. Moreover, copper was used for such current collectors, and a shape thereof was a rectangle with a width 598 mm×a length 52 mm.

The above-described components were stacked on one another while interposing an appropriate seal member thereamong in an order of the end plate (cathode)-the current collector-the separator-the GDL-the CCM-the GDL-the separator-the current collector-the end plate (anode), whereby a fuel cell single cell was composed.

Then, a ribbon heater was wound around a periphery of the above-described fuel cell single cell, and a temperature of the fuel cell single cell was adjusted to 80° C. Moreover, air with a pressure of 200 kPa_a and a dew point of 54° C. was flown to one of the end plates, and hydrogen with a pressure of 200 kPa_a and a dew point of 54° C. was flow to the other end plate. The air and the hydrogen were flown at flow rates of 10 NL/min and 4 NL/min, respectively, so as to make counter flows. Then, the fuel cell single cell was operated at a current density of 1.2 A/cm$^2$. As a result, the fuel cell single cell was able to be stably operated under conditions where a pressure loss of the cathode was 23 kPa, and a pressure loss of the anode was 7 kPa.

Example 2, Comparative Example 1

The fuel cell according to the present invention has a feature in that the aspect ratio of the shape of the membrane electrode assembly is less than 2. However, in the case where it is assumed that such a full-size fuel cell is divided into a plurality of sub-scale fuel cells in parallel to the flow passage direction while keeping on maintaining the preferable horizontal direction equivalent diameter, and that a variety of fluids proportional to a catalyst layer area of such a divided sub-scale fuel cell are supplied, then it is considered that, per unit area, one sub-scale fuel cell has the same power generation characteristics as those of the full-size fuel cell. Actually, when the sub-scale fuel cell as described above is used, the power generation characteristics of the full-size fuel cell can be easily estimated in a small experiment facility, and accordingly, this is preferable. Accordingly, for the purpose of investigating the power generation characteristics (and drainage characteristics) of Example 1 in detail by the sub-scale fuel cell, fuel cells of Example 2 and Comparative example 1, which are as follows, were created.

Example 2

First, the membrane electrode assembly of Example 1 was cut out to a size of a width 50 mm×a length 50 mm. Moreover, by using the separators of Example 1, the flow rates of the fuel gas and the oxidant gas were also set at a 50 (mm)/593 (mm) time that of Example 1. In such a way, the sub-scale fuel cell (aspect ratio R=1) of Example 2 was created.

Comparative Example 1

First, the membrane electrode assembly of Example 1 was cut out to a size of a width 50 mm×a length 50 mm. Next, separators were prepared, each of which included "serpentine flow passages" having flow passages rectangular in cross section, in which a flow passage height was 1 mm, a rib width was 1 mm, a channel width was 1 mm, a rib pitch was 2 mm, a length in a flow passage direction was 50 mm, and a length in a width direction was 50 mm. By using these, the sub-scale fuel cell of Comparative example 1 was created.

Note that two lines of the above-described serpentine flow passages made a set, and the number of folding times thereof at 180 degrees was 10. Hence, a substantial flow passage length is a length 50 mm in the flow passage direction×10 times=500 mm, and a substantial flow passage width is a rib pitch 2 mm×2 lines=4 mm, and accordingly, a substantial aspect ratio R is equivalent to 125. That is to say, for the sub-scale fuel cell using the flow passage, a flow rate was set on the assumption that the sub-scale fuel cell corresponds to a slender sub-scale fuel cell cut out by a length in a width direction 2 mm×2 lines=4 mm from a high-aspect fuel cell (aspect ratio R=10) with a flow passage length 500 mm×a flow passage width 50 mm.

Evaluation of Power Generation of Example 2 and Comparative Example 1

Figure 9:
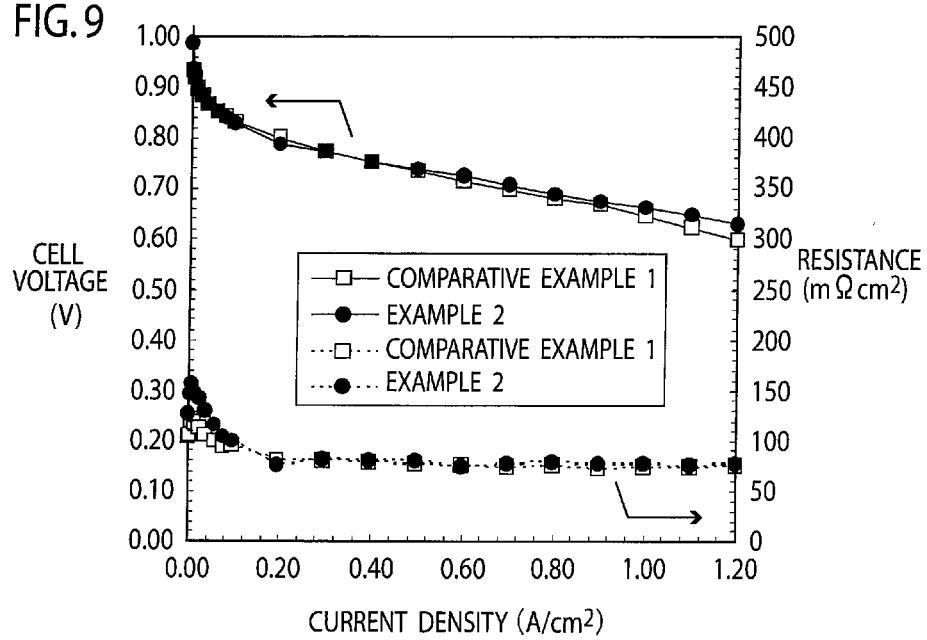
FIG. 9 is a graph showing results of evaluating IV characteristics of Example 2 and Comparative example 1.

FIG. 9 shows results of evaluating IV characteristics by using the fuel cells of Example 2 and Comparative example 1, which are described above. The IV characteristics are an abbreviation of current-voltage characteristics, and IV characteristics with a higher voltage at the same current density are superior. As shown in FIG. 9, remarkably, the fuel cell of Example 2 exhibited superior power generation characteristics at a current density of 1 A/cm$^2$ or more to the fuel cell of Comparative example 1 though the flow passage height in the fuel cell of Example 2 was reduced to 1/10 of that of Comparative example 1.

Figure 10:
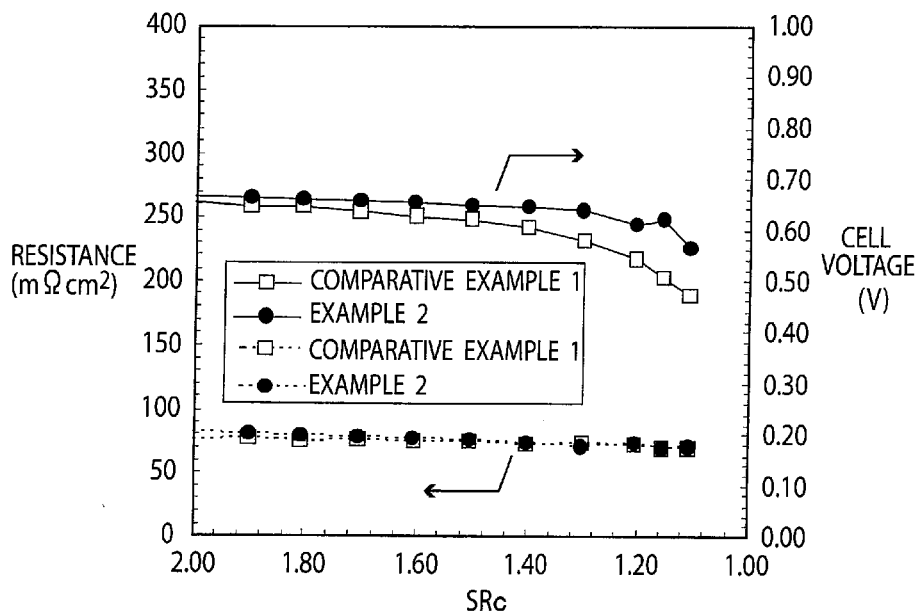
FIG. 10 is a graph showing results of evaluation SR characteristics of Example 2 and Comparative example 1.

Moreover, FIG. 10 shows results of evaluating SR characteristics by using the fuel cells of Example 2 and Comparative example 1, which are described above. The SR characteristics are an abbreviation of stoichiometric ratio-voltage characteristics, and SR characteristics with a higher voltage in the same stoichiometric ratio are superior. Further, SR characteristics in which the fuel cell can generate electricity with low stoichiometric ratio are superior. Here, the matter that the stoichiometric ratio is equal to 1 stands for a state where, in terms of the flow rate, the oxidant gas or the fuel gas is supplied by only an amount necessary to generate a certain current density. Remarkably, the fuel cell of Example 2 exhibited superior power generation characteristics to the fuel cell of Comparative example 1 though the flow passage height in the fuel cell of Example 2 was reduced to 1/10 of that of Comparative example 1.

Note that, with regard to the high aspect ratio fuel cell, in Comparative example 1, it is assumed that the high aspect ratio fuel cell is divided into the plurality of sub-scale fuel cells in parallel to the flow passage direction. In the case where the high aspect ratio fuel cell is divided into the plurality of sub-scale fuel cells perpendicularly to the flow passage direction, then the respective sub-scale fuel cells exhibit different power generation characteristics depending on positions where the sub-scale fuel cells are cut out, and accordingly, it is not easy to estimate the power generation characteristics of the full-size fuel cell.

Example 3

Evaluation of power generation in Example 3 was performed by using the fuel cell of Example 2 and setting operation conditions as follows. Specifically, the stoichiometric ratio was set at 1.6 (anode) and 1.5 (cathode), inlet relative humidity was set at non-humidification (anode) and 20% RH (cathode), and an operation pressure was set at 200 kPa (absolute pressure). Moreover, thicknesses of the Carbon Paper serving as the gas diffusion layers and of the electrolyte membrane were set at 80 μm and 15 μm, respectively. The power generation characteristics were evaluated by a similar method to that of Example 2 other than the above.

Note that, when the Carbon Paper with a thickness of 80 μm was used in the fuel cell of Comparative example 1, since the channel width was wide (channel width: 1 mm) therein, the Carbon Paper was broken at a rib edge, the electrolyte membrane was damaged, and a short circuit occurred. As opposed to this, in the fuel cell of Example 3, such a short circuit did not occur. This is assumed to be because an influence of the rib edge was reduced since the channel width is narrow (channel width: 0.2 mm).

Figure 11:
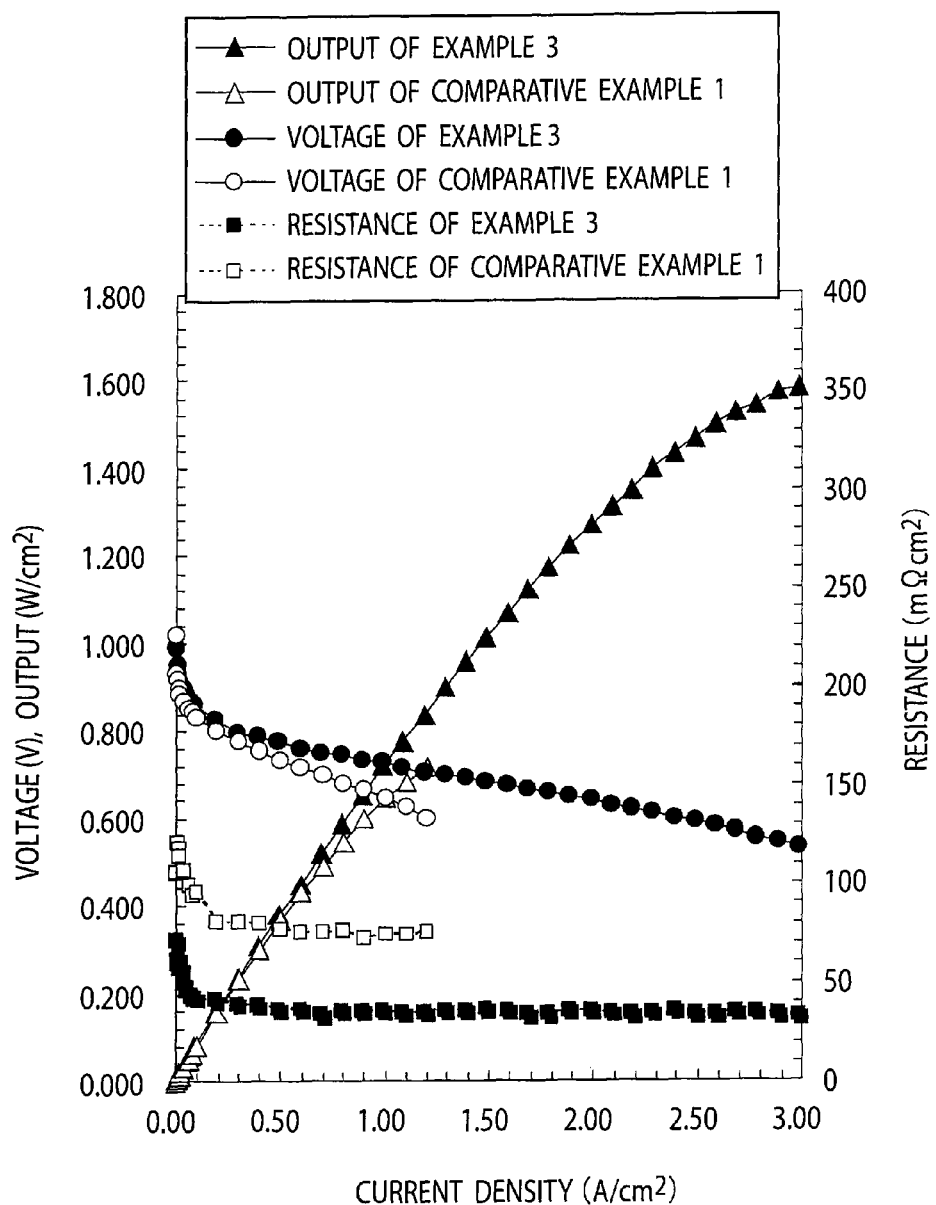
FIG. 11 is a graph showing relationships of voltages, outputs and resistances with respect to current densities in Example 3 and Comparative example 1.

FIG. 11 shows results of evaluating IV characteristics of Example 3 and Comparative example 1. The fuel cell of Example 3 exhibited excellent power generation characteristics which were: 0.681V at 1.486 A/cm², and 0.601V at 2.383 A/cm². Meanwhile, in the fuel cell of Comparative example 1, power generation characteristics thereof were 0.598V at 1.200 A/cm², and the fuel cell of Example 3 was able to obtain a current density 1.98 times that of the fuel cell of Comparative example 1 at the same voltage. Note that a pressure loss at 2.383 A/cm² in Example 3 was 4.2 kPa on the cathode, and 12 kPa on the anode.

As described above, Example 2 and Example 3 exhibited the excellent power generation characteristics in comparison with Comparative example 1. Reasons for this are still unknown; however, are assumed as follows. (1) Cell resistance is approximately a half of that in a usual case; and accordingly, by microfabrication of the channel width, area utilization efficiency of the active area was improved. (2) In the fuel cell of each example, the pressure loss thereof is equivalent to that of the conventional technology (hence, a load on a fluid supply device is also equivalent). However, in the fuel cell of each example, the flow passage length is short, and a "gradient" of the pressure loss is steeper than in the conventional technology, and as a result, the produced water was able to be surely removed in spite of the microfabrication and miniaturization of the flow passage height.

As described above, in the fuel cell of the present invention, the above-described membrane electrode assembly and separators form the substantially rectangular shape, and aspect ratio R as a ratio (flow passage length/flow passage width) of the flow passage length with respect to the flow passage width on the cathode side or the anode side in the membrane electrode assembly is 0.01 or more to less than 2. Moreover, at least one of each gas diffusion layer and each separator has the flow passages, and the horizontal direction equivalent diameter D (mm) of the flow passages satisfies Expression (1). These two features are organically coupled to each other, whereby, as in the examples described above, it becomes possible to reduce the flow passage height to a larger extent than in the conventional while preventing the performance decrease of the fuel cell.

The entire contents of Japanese Patent Application No. 2009-259611 (filed on: Nov. 13, 2009) are incorporated herein by reference.

The description has been made above of the contents of the present invention along the embodiment and the examples; however, the present invention is not limited to the description of these, and it is obvious for those skilled in the art that the present invention is capable of varieties of modifications and improvements.

INDUSTRIAL APPLICABILITY

The fuel cell according to the present invention has a feature in that each of the membrane electrode assembly and the separators adopts the low-aspect structure, and that the horizontal direction equivalent diameter of the flow passages, which is introduced from the above-described aspect ratio and the area of the catalyst layer, is within the predetermined range. In such a way, even at the same area of the active area, the same pressure loss and the same gas flow rate as those in the conventional fuel cell, it becomes possible to transport the fuel gas, the oxidant gas, the coolant, and the water vapor, the produced water and the like, which are generated following the power generation, at a smaller flow passage height, that is, at a smaller cell pitch. Hence, in accordance with the fuel cell of the present invention, the anti-flooding characteristics can be maintained, and the miniaturization of the fuel cell can be achieved.

Moreover, in a second aspect of the fuel cell according to the present invention, in addition to the low-aspect structure, the plurality of manifolds are provided on the outer circumferential portions or outsides of the two opposed sides of the membrane electrode assembly. In such a way, the gases and the coolant are appropriately divided in the width direction of the low-aspect structure, and as a result, the gases and the coolant can be guided easily and uniformly onto the membrane electrode assembly.

REFERENCE SIGNS LIST

1 Fuel Cell
2 Separator
3 Membrane Electrode Assembly
4 Fuel Cell Single Cell
5 Gas Diffusion Layer
6 Catalyst Layer
7 Electrolyte Membrane
8 Widened Portion
9 Fuel Gas Manifold
10 Coolant Manifold
11 Oxidant Gas Manifold
12 Seal Member
13 Flow Passage
14 Widened Portion Dividing Portion
15 Gas Diffusion Layer Dividing Portion
18 Vehicle

The invention claimed is:

1. A fuel cell comprising: a stacked body of a membrane electrode assembly including anode and cathode electrode layers on both surfaces of an electrolyte membrane, and of separators,
wherein the membrane electrode assembly and the separators are formed into a substantially rectangular shape,
each of the electrode layers comprises a gas diffusion layer and a catalyst layer,
each of the separators or the gas diffusion layer includes flow passages,
an aspect ratio R as a ratio (length of side parallel to flow passage direction/length of side perpendicular to flow passage direction) of a length of a side parallel to a flow passage direction with respect to a length of a side perpendicular to the flow passage direction on a cathode-side or anode-side catalyst layer coating surface of the electrode layer is 0.01 or more to less than 0.6,
in the membrane electrode assembly, on one of outer circumferential portions of two opposed sides perpendicular to the flow passage direction, two or more oxidant gas introduction manifolds for introducing oxidant gas or two or more fuel gas introduction manifolds for introducing fuel gas are arranged, and on other of the outer circumferential portions of the two opposed sides, two or more oxidant gas discharge manifolds for discharging the oxidant gas introduced from the oxidant gas introduction manifolds or two or more fuel gas discharge manifolds for discharging the fuel gas introduced from the fuel gas introduction manifolds are arranged, and
a horizontal direction equivalent diameter D (mm) of the flow passages satisfies Expression (1):

$$D = B \times (R \times \text{Acat})^{1/3} \quad \text{Expression (1)}$$

where Acat is an area (cm$^2$) of the catalyst layer of the membrane electrode assembly, and B is a constant of 0.02 or more to 0.08 or less.

2. The fuel cell according to claim 1, wherein widened portions are provided, the widened portions being formed by providing a gap between the catalyst layer and the two or more oxidant gas introduction manifolds or the two or more fuel gas introduction manifolds, and serving as a flow passage that supplies the oxidant gas or fuel gas to the catalyst layer.

3. The fuel cell according to claim 1,
wherein, in the membrane electrode assembly, on one of the outer circumferential portions of the two opposed sides perpendicular to the flow passage direction, the two or more oxidant gas introduction manifolds and the two or more fuel gas discharge manifolds are arranged alternately with each other, and on the other of the outer circumferential portions of the two opposed sides, the two or more oxidant gas discharge manifolds or the two or more fuel gas introduction manifolds are arranged, and
one widened portion is provided, the widened portion being formed by providing a gap between the catalyst layer and the two or more oxidant gas introduction manifolds and the two or more fuel gas discharge manifolds, and serving as a flow passage that supplies the oxidant gas to the catalyst layer.

4. The fuel cell according to claim 2, wherein a length L of the widened portions is 1% or more to 30% or less of the flow passage length of the membrane electrode assembly.

5. The fuel cell according to claim 2, wherein a total sum AOx of cross-sectional areas of the oxidant gas introduction manifolds and the oxidant gas discharge manifolds is 1% or more to 30% or less of the catalyst area Acat, and a total sum ARe of cross-sectional areas of the fuel gas introduction manifolds and the fuel gas discharge manifolds is 1% or more to 30% or less of the catalyst area Acat.

6. The fuel cell according to claim 2, wherein a number of divisions NOx of the oxidant gas introduction manifolds or the oxidant gas discharge manifolds is 2 or more to 100 or less, and a number of divisions NRe of the fuel gas introduction manifolds or the fuel gas discharge manifolds is 2 or more to 100 or less.

7. The fuel cell according to claim 6, wherein the widened portions are divided in parallel to a flow passage direction of the membrane electrode assembly, and a number of divisions of the widened portions is NOx.

8. The fuel cell according to claim 6, wherein the gas diffusion layer is divided in parallel to a flow passage direction of the membrane electrode assembly, and a number of divisions of the gas diffusion layer is NOx.

9. A fuel cell, wherein the fuel cell according to claim 1 is a polymer electrolyte fuel cell.

10. A vehicle comprising the fuel cell according to claim 1.

11. The fuel cell according to claim 1,
wherein, in the membrane electrode assembly, on one of the outer circumferential portions of the two opposed sides perpendicular to the flow passage direction, the two or more oxidant gas introduction manifolds and the two or more fuel gas introduction manifolds are arranged alternately with each other, and on the other of the outer circumferential portions of the two opposed sides, the two or more oxidant gas discharge manifolds and the two or more fuel gas discharge manifolds are arranged, and
one widened portion is provided, the widened portion being formed by providing a gap between the catalyst layer and the two or more oxidant gas introduction manifolds and the two or more fuel gas introduction manifolds, and serving as a flow passage that supplies the oxidant gas to the catalyst layer.

* * * * *